Figure 1:
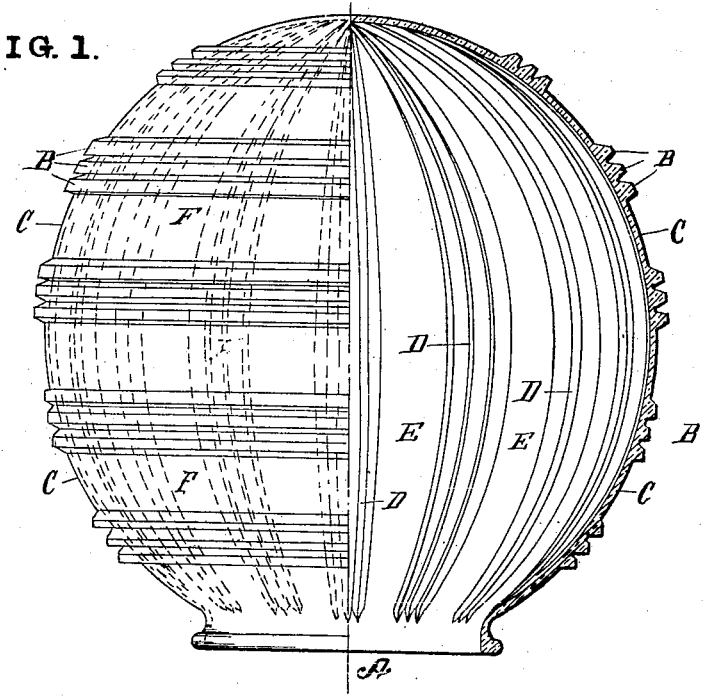

No. 805,742. PATENTED NOV. 28, 1905.
O. A. MYGATT.
PRISMATIC GLASS GLOBE OR SHADE.
APPLICATION FILED JULY 13, 1905.

WITNESSES:
Chas. K. Davis.
M. E. Brown.

INVENTOR
O. A. Mygatt
BY W. H. Bartlett
His Attorney

UNITED STATES PATENT OFFICE.

OTIS A. MYGATT, OF NEW YORK, N. Y.

PRISMATIC-GLASS GLOBE OR SHADE.

No. 805,742.　　　Specification of Letters Patent.　　Patented Nov. 28, 1905.

Application filed July 13, 1905. Serial No. 269,546.

*To all whom it may concern:*

Be it known that I, OTIS A. MYGATT, a citizen of the United States, residing at New York, in the county of New York and State of New York, have invented certain new and useful Improvements in Prismatic-Glass Globes or Shades, of which the following is a specification, reference being had therein to the accompanying drawings.

This invention relates to prismatic-glass light-controlling and decorative globes and shades.

The object of my present invention is to make a globe which shall have all the rich, sparkling, and decorative appearance of so-called "bead-glass" globes and yet have the efficiency of a scientifically-calculated prismatic-glass globe.

Prismatic globes as at present made have, as a rule, their interior surface entirely covered with diffusing-prisms and their exterior surface covered with generally horizontal light-distributing prisms. The result of covering the interior inner surface with vertical or radial diffusing-prisms and the outer surface with horizontally-circumferential distributing-prisms is to give a globe having a nearly uniformly illuminated appearance. While in most cases of lighting this evenly-illuminated appearance is soft on the eyesight and agreeable to most people, yet there are a great many cases where the lack of sparkle caused by the even diffusing and distributing of the light is objectionable.

Bead-glass globes as now made and sold in large quantities are composed of cut-glass beads of different sizes, wired through their center, and then wired over a clear transparent globe in lines close together. Such glass globes are very expensive. They have a decorative appearance, however, and have therefore come into frequent use, notwithstanding their high expense, owing to the fact that they look rich and there is a sort of sparkle about them which prism-glass globes lack.

Notwithstanding their rich and sparkling appearance and their great expense bead-glass globes absorb probably more light than any sort of glass globe in the market. Tests made on such glass globes show that the waste of light is generally over fifty per cent. and frequently as large as eighty per cent.

Not only are bead-glass globes the worst absorbers of light and are expensive, but they are the hardest to clean of any globes on the market.

My present invention is intended to produce a glass globe which shall be much more economical in price than the bead-glass globe and which will be equally sparkling and rich in appearance, but give practically twice the light return, owing to the fact that in my globe all the surfaces can be calculated, whereas in the bead-glass globe no surfaces whatever are calculated, they being composed but of glass beads of various sizes and outlines wired together.

The cause of ordinary prism-glass globes being somewhat too evenly illuminated, and therefore somewhat too monotonous as regards sparkle, is owing to the whole interior and exterior surfaces being covered with diffusing-prisms and light-distributing prisms, so there is no chance for the direct light from the lamp within to strike the eye.

What gives the bead-glass globe its rich effect is the fact that between the beads are clear spaces through which the incandescent filament of the lamp or source of light within reaches the eye direct without being diffused or dispersed by any intermediate surface. This effect I obtain by making the prisms of glass globes in the following way: I cover the inside of my globe with lunes of one or more vertical prisms alternating with smooth glass portions. I cover the outside of my globe with zones of one or more horizontal diffusing or distributing prisms alternating with smooth glass portions.

Figure 2:
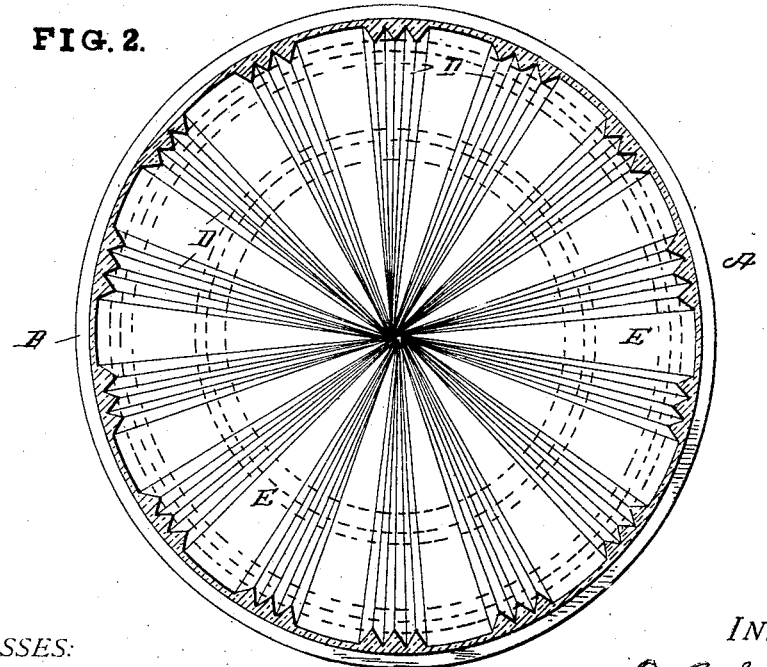

Figure 1 is a partial section and partial elevation of a globe made according to my present invention. Fig. 2 is a horizontal central section of the same looking upward.

The body A of the globe or shade is in this case shown as nearly spherical; but any approved form may be adopted. The globe is shown in Fig. 1 in the position it usually occupies when inclosing an incandescent electric lamp.

Around the outside of the globe are zones composed of light-distributing prisms B. These are prisms which permit most of the light-rays to pass through the glass, but serve to direct the rays. The zones are shown as composed of three prisms; but any number of prisms may be grouped. Between the zones of prisms B there are plain or smooth zones C, through the surface of which the light-rays are transmitted without substantial deflection.

Inside the globe there are ribs D, arranged to follow lunar lines on the globe. These ribs serve to diffuse the light-rays which reach them, but offer no substantial obstruction to their passage. The lunes are shown as composed of three ribs; but other number might be used. Between the ribs D there are smooth or plain lunar spaces E, by which the light-rays are transmitted and not diverted. The ribs show through the glass, giving a checkered or plaid appearance. At certain places the light-rays will be diffused by the internal ribs and distributed or directed by the external prisms in passing out of the globe. At other places the rays will be diffused, but not directed, in passing out of the smooth glass. At other places the rays will pass out of smooth spaces, as at F F, without being diverted and will have brilliance and sparkle similar to some rays from beaded globes.

A study of the drawings will show that the vertical smooth glass portions of the inside and the horizontal smooth glass portions on the outside where they cross each other become little squares or "windows" through which the direct rays of a light within can reach the eye. It is this that gives bead-glass its rich sparkling appearance, and by this means I make in a generally one-piece glass globe (though not necessarily one piece) an article which is far cheaper than the bead-glass globe, more than twice as efficient in light return, and its equal in richness and sparkle, owing to the numerous windows or clear glass spaces which occur at regular intervals over the surface of the globe.

What I claim is—

1. A shade of transparent glass having on its inner surface diffusing-ribs with intermediate plain surfaces, and on its outer surfaces distributing-prisms with interposed plain surfaces.

2. A shade of transparent glass having lunes composed of a plurality of diffusing-ribs, and plain surfaces between the lunes, and having externally light-distributing prisms.

3. A shade of transparent glass having lunes composed of light-distributing ribs and interposed lunes of plain glass, and having external zones composed of a plurality of light-distributing prisms, and interposed zones with plain surfaces.

In testimony whereof I affix my signature in presence of two witnesses.

OTIS A. MYGATT.

Witnesses:
H. E. NASON,
ROBERT KELLY, Jr.